(12) United States Patent
Radomyselski et al.

(10) Patent No.: US 7,297,277 B2
(45) Date of Patent: **\*Nov. 20, 2007**

(54) METHOD FOR PURIFYING A DRY CLEANING SOLVENT

(75) Inventors: Arseni Valerevich Radomyselski, Loveland, OH (US); John Christian Haught, West Chester, OH (US); William Michael Scheper, Guilford, IN (US); Mark Robert Sivik, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 366 days.

This patent is subject to a terminal disclaimer.

(21) Appl. No.: 10/876,123

(22) Filed: Jun. 24, 2004

(65) Prior Publication Data

US 2005/0000897 A1    Jan. 6, 2005

Related U.S. Application Data

(60) Provisional application No. 60/547,368, filed on Feb. 24, 2004, provisional application No. 60/547,355, filed on Feb. 24, 2004, provisional application No. 60/547,126, filed on Feb. 24, 2004, provisional application No. 60/483,290, filed on Jun. 27, 2003, provisional application No. 60/483,154, filed on Jun. 27, 2003.

(51) Int. Cl.
*B01D 11/00* (2006.01)
*B01D 61/00* (2006.01)
*B08B 7/04* (2006.01)
*B08B 1/36* (2006.01)

(52) U.S. Cl. ............................ 210/644; 134/10; 8/141; 8/142

(58) Field of Classification Search ........ 210/650–654, 210/640, 663, 670, 689, 684, 500.25, 644; 95/45, 52; 8/142, 141; 134/10, 13
See application file for complete search history.

(56) References Cited

U.S. PATENT DOCUMENTS

| | | | |
|---|---|---|---|
| 3,395,086 A | | 7/1968 | Victor et al. |
| 3,441,501 A | | 4/1969 | Segall et al. |
| 3,692,467 A | | 9/1972 | Durr et al. |
| 3,733,267 A | | 5/1973 | Haase et al. |
| 3,839,176 A | | 10/1974 | McCoy et al. |
| 4,108,599 A | | 8/1978 | Coll-Palagos et al. |
| 4,247,674 A | * | 1/1981 | Koshar et al. ............... 528/21 |
| 4,309,247 A | | 1/1982 | Hou et al. |
| 4,584,092 A | | 4/1986 | Kanematu et al. |
| 4,604,205 A | | 8/1986 | Ayers et al. |
| 4,664,754 A | | 5/1987 | Caputi et al. |
| 4,747,960 A | | 5/1988 | Freeman |
| 5,057,240 A | | 10/1991 | Madore et al. |
| 5,265,734 A | | 11/1993 | Linder et al. |
| 5,639,375 A | * | 6/1997 | Hiroshi ....................... 210/640 |

(Continued)

FOREIGN PATENT DOCUMENTS

DE          3739711          6/1989

(Continued)

*Primary Examiner*—Ana Fortuna
(74) *Attorney, Agent, or Firm*—Kim W. Zerby; Steven W. Miller

(57) ABSTRACT

A method for purifying dry cleaning solvents containing laundry soils. The method employs membrane filtration to enhance the separation of the contaminants from the dry cleaning solvent.

16 Claims, 1 Drawing Sheet

U.S. PATENT DOCUMENTS

| | | |
|---|---|---|
| 5,882,506 A | 3/1999 | Ohsol et al. |
| 5,939,478 A * | 8/1999 | Beck et al. ............... 524/266 |
| 6,042,618 A | 3/2000 | Berndt et al. |
| 6,059,845 A | 5/2000 | Berndt et al. |
| 6,063,135 A | 5/2000 | Berndt et al. |
| 6,086,635 A | 7/2000 | Berndt et al. |
| 6,310,029 B1 | 10/2001 | Kilgour et al. |
| 6,312,476 B1 | 11/2001 | Perry et al. |
| 6,313,079 B1 | 11/2001 | Murphy et al. |
| 6,340,433 B1 * | 1/2002 | Kuznicki et al. .......... 210/651 |
| 6,368,359 B1 | 4/2002 | Perry et al. |
| 6,691,356 B1 * | 2/2004 | Coma ........................ 5/722 |
| 6,865,173 B1 * | 3/2005 | Czaja et al. ............... 370/342 |
| 6,898,951 B2 * | 5/2005 | Severns et al. ............ 68/5 C |
| 6,914,040 B2 * | 7/2005 | Deak et al. ............... 510/285 |
| 6,930,079 B2 * | 8/2005 | Deak et al. ............... 510/285 |
| 6,998,377 B2 * | 2/2006 | Deak et al. ............... 510/285 |
| 7,084,099 B2 * | 8/2006 | Radomyselski et al. ..... 510/285 |
| 2001/0004062 A1 | 6/2001 | Rutledge et al. |
| 2002/0017493 A1 | 2/2002 | Ehrensperger et al. |
| 2002/0038480 A1 | 4/2002 | Deak et al. |
| 2002/0184715 A1 | 12/2002 | Taylor et al. |
| 2003/0196282 A1 | 10/2003 | Fyvie et al. |

FOREIGN PATENT DOCUMENTS

| | | |
|---|---|---|
| DE | 299 21 805 U1 | 6/2000 |
| EP | 0 669 152 A1 | 8/1995 |
| EP | 0841 362 | 5/1998 |
| GB | 807200 | 1/1959 |
| JP | 61-085995 | 5/1986 |
| JP | 01 075005 A | 3/1989 |
| JP | 64-75005 * | 3/1989 |
| JP | 02 004430 A | 1/1990 |
| JP | 7 080250 A | 3/1995 |
| JP | (HEI) 07-80250 | 3/1995 |
| WO | WO 01/06051 A1 | 1/2001 |
| WO | WO 01/27380 A1 | 4/2001 |
| WO | WO 01/34613 A1 | 5/2001 |
| WO | WO 01/44256 A1 | 6/2001 |
| WO | WO 01/93977 A2 | 12/2001 |
| WO | WO 01/94679 A2 | 12/2001 |
| WO | WO 02/077356 A1 | 10/2002 |

* cited by examiner

METHOD FOR PURIFYING A DRY CLEANING SOLVENT

CROSS REFERENCE TO RELATED APPLICATIONS

This application claims the benefit of U.S. Provisional Application Ser. No. 60/483,154 filed on Jun. 27, 2003; U.S. Provisional Application Ser. No. 60/483,290 filed on Jun. 27, 2003; U.S. Provisional Application Ser. No. 60/547,126 filed on Feb. 24, 2004; U.S. Provisional Application Ser. No. 60/547,368 filed on Feb. 24, 2004; and U.S. Provisional Application Ser. No. 60/547,355 filed on Feb. 24, 2004.

FIELD OF THE INVENTION

The present invention relates to a method of purifying used dry cleaning solvents containing laundry soils. The method employs membrane filtration to enhance the separation of the contaminants from the dry cleaning solvent with decreased energy consumption and solvent loss.

BACKGROUND OF THE INVENTION

Conventional laundering techniques for cleaning and refreshing (e.g., removing malodors) fabric articles can be generally categorized into the aqueous-based washing technique and the "dry cleaning" technique. The former involves immersion of the fabric article in a solution comprising primarily of water; detergent or soap may be added to enhance the cleaning function. The latter typically involves the use of non-aqueous fluids as the agent for cleaning and refreshing.

Cleaning solvents, after being used in a laundering treatment, typically comprise contaminants, such as dyes, water and/or surfactants. Since the dry cleaning solvents are more expensive than water, there is a need to recycle/reuse the dry cleaning solvents in more than one treatment.

Conventional dry cleaning solvents are subjected to a distillation method to remove some contaminants. Representative systems using the distillation method are disclosed in EP 543,665 and U.S. Pat. Nos. 5,942,007; 6,056,789; 6,059,845; and 6,086,635. However, equipment and conditions to run the distillation are extremely burdensome as well as energy consuming; thus, distillation method is not practical for consumer applications or home use. Among the drawbacks of the distillation method is the high cost of the distillation unit, the daily manual intervention required to clean the still bottom, and its ineffectiveness in removing volatile contaminants. Accordingly, there is a need to remove contaminants from dry cleaning solvents without distillation.

There have been other methods to remove contaminants from dry cleaning solvents without distillation. Typically, these non-distillation methods use filtration only systems with adsorbent materials, such as activated carbons and/or clay. For example, the commonly used, commercially available KleenRite® filter is made of a clay absorbent and an activated carbon adsorbent. Representative filters containing carbon and clay adsorbent materials are disclosed in U.S. Pat. Nos. 4,277,336 and 3,658,459. However, such filter has a rather limited lifetime due to the high percentage of clay absorbent in the filter. The clay absorbent has a finite capacity for absorbing contaminants, such as water, and once that capacity is met, the filter must be replaced with a new filter. In addition to the limitations around the clay absorbent, the activated carbon adsorbent has limitations also. The particle size and/or pore size of the activated carbon adsorbent material allows some contaminants to flow past the activated carbon adsorbent material, thus making the filter ineffective. Further, in conventional use, the used, contaminated dry cleaning solvent is pumped through the filter at a rate that does not allow the clay absorbent and/or activated carbon adsorbent to remove contaminants effectively. This is especially true for those contaminants that are highly soluble in the dry cleaning solvent. Additionally, some of the solvents are lost due to the frequent changes of the filters.

Therefore, it is desirable to have a method that effectively removes contaminants from a dry cleaning solvent such that the purified solvent can be recycled/reused.

It is also desirable to have a method capable of purifying a dry cleaning solvent in an economical and energy efficient manner.

It is further desirable to have a non-distillation method that effectively removes contaminants from the dry cleaning solvent at low temperature and ambient pressure.

Additionally, it is desirable that the material used in the purification method is safe and durable.

SUMMARY OF THE INVENTION

The present invention relates to a process for purifying a lipophilic fluid containing laundry soils, the process comprising the steps of:
 a. providing a mixture comprising a lipophilic fluid and laundry soils;
 b. optionally, treating the mixture; and
 c. passing the mixture through a membrane, thereby removing the laundry soils and converting the lipophilic fluid to a purified lipophilic fluid.

DETAILED DESCRIPTION

Definitions

Figure 1:
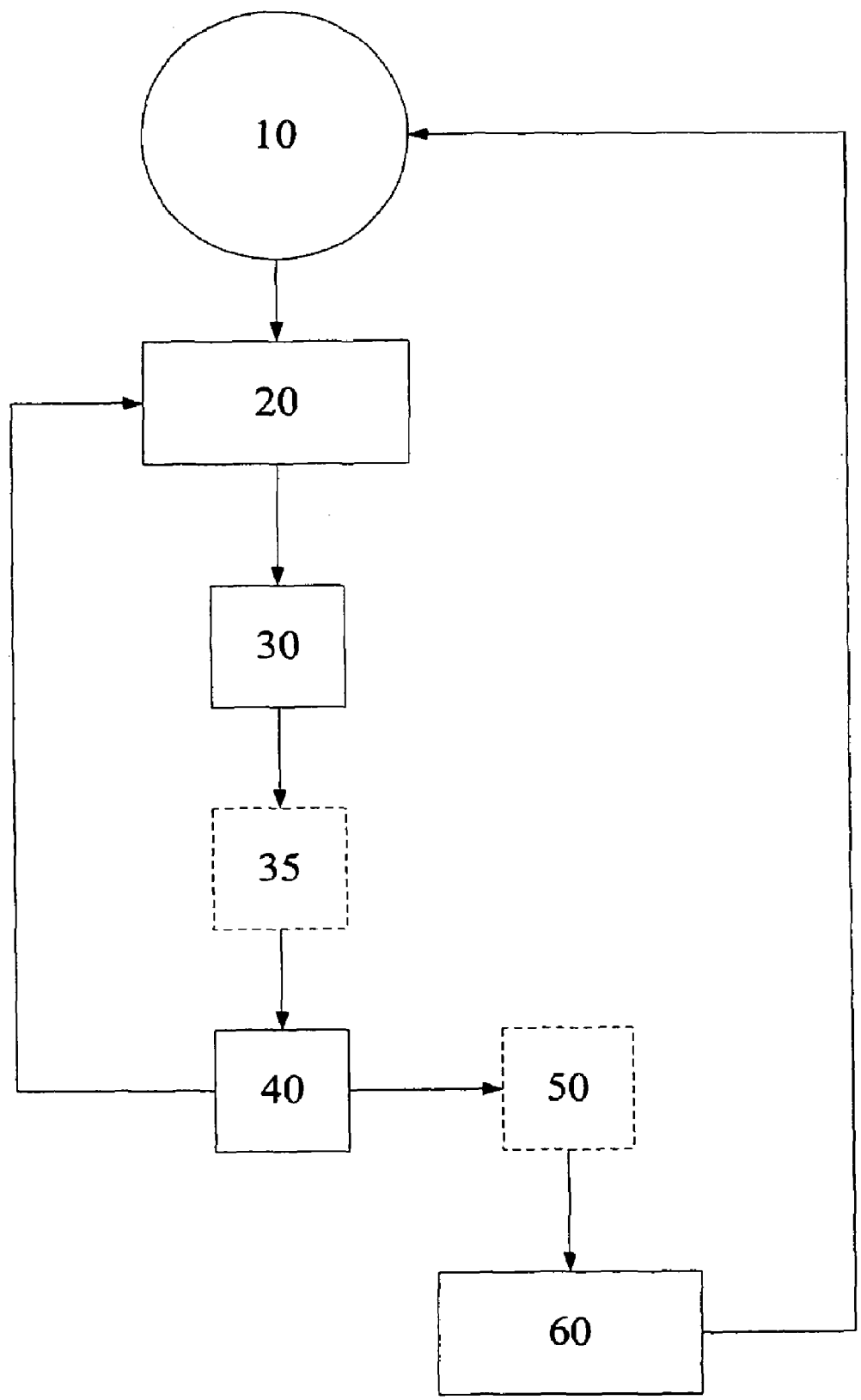
FIG. 1 is a schematic representation of a cleaning system containing a membrane filtration unit, in accordance with one embodiment of the present invention.

The term "fabric article" as used herein means any article that is customarily cleaned in a conventional laundry process or in a cleaning process. As such the term encompasses articles of clothing, linen, drapery, and clothing accessories. The term also encompasses other items made in whole or in part of fabric, such as tote bags, furniture covers, tarpaulins and the like.

The term "absorbent material" or "absorbent polymer" as used herein means any material capable of selectively ingesting (i.e., absorbing or adsorbing) water and/or water-containing liquids without ingesting dry cleaning solvents. In other words, absorbent materials or absorbent polymers comprise a water absorbing agent, which is referred to in the art as "gel", "polymeric gel" and "super absorbent polymers".

The term "dry cleaning solvent" as used herein means any non-aqueous fluid capable of removing sebum. Dry cleaning solvents include lipophilic fluids, which are described in more details herein below.

The term "cleaning composition" as used herein means any dry cleaning solvent-containing composition that comes into direct contact with fabric articles to be cleaned. It should be understood that the composition can have uses other than cleaning, such as conditioning, sizing, and other fabric care treatments. Thus, it may be used interchangeably with the term "treating composition" or "fabric care composition". Furthermore, optional cleaning adjuncts such as additional detersive surfactants, bleaches, perfumes, and the like may be added to the "cleaning composition". That is, cleaning adjuncts may be optionally combined with the dry cleaning solvent. These optional cleaning adjuncts are described in more detail herein below.

The term "dry cleaning" or "non-aqueous cleaning" as used herein means a non-aqueous fluid is used as the dry cleaning solvent to clean a fabric article. However, water can be added to the "dry cleaning" method as an adjunct cleaning agent. The amount of water can comprise up to about 25% by weight of the dry cleaning solvent or the cleaning composition in a "dry cleaning" process. The non-aqueous fluid is referred to as the "lipophilic fluid" or "dry cleaning solvent".

The terms "soil" or "laundry soil" as used herein means any undesirable extraneous substance on a fabric article that is the target for removal by a cleaning process. By the terms "water-based" or "hydrophilic" soils, it is meant that the soil comprised water at the time it first came in contact with the fabric article, or the soil retains a certain amount of water on the fabric article. Examples of water-based soils include, but are not limited to beverages, many food soils, water soluble dyes, bodily fluids such as sweat, urine or blood, outdoor soils such as grass stains and mud. On the other hand, the term "lipophilic" soils, as used herein means the soil has high solubility in or affinity for the lipophilic fluid. Examples of lipophilic soils include, but are not limited to body soils, such as mono-, di-, and tri-glycerides, saturated and unsaturated fatty acids, non-polar hydrocarbons, waxes and wax esters, lipids; and laundry materials such as non-ionic surfactants; and mixtures thereof.

All percentages are based on weight percent unless specifically stated otherwise.

Lipophilic Fluid

"Lipophilic fluid" as used herein means any liquid or mixture of liquid that is immiscible with water at up to 20% by weight of water. In general, a suitable lipophilic fluid can be fully liquid at ambient temperature and pressure, can be an easily melted solid, e.g., one that becomes liquid at temperatures in the range from about 0° C. to about 60° C., or can comprise a mixture of liquid and vapor phases at ambient temperatures and pressures, e.g., at 25° C. and 1 atm. pressure.

It is preferred that the lipophilic fluid herein be non-flammable or, have relatively high flash points and/or low VOC characteristics, these terms having conventional meanings as used in the dry cleaning industry, to equal or, preferably, exceed the characteristics of known conventional dry cleaning fluids.

Non-limiting examples of suitable lipophilic fluid materials include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof.

"Siloxane" as used herein means silicone fluids that are non-polar and insoluble in water or lower alcohols. Linear siloxanes (see for example U.S. Pat. Nos. 5,443,747, and 5,977,040) and cyclic siloxanes are useful herein, including the cyclic siloxanes selected from the group consisting of octamethyl-cyclotetrasiloxane (tetramer), dodecamethyl-cyclohexasiloxane (hexamer), and preferably decamethyl-cyclopentasiloxane (pentamer, commonly referred to as "D5"). A preferred siloxane comprises more than about 50% cyclic siloxane pentamer, more preferably more than about 75% cyclic siloxane pentamer, most preferably at least about 90% of the cyclic siloxane pentamer. Also preferred for use herein are siloxanes that are a mixture of cyclic siloxanes having at least about 90% (preferably at least about 95%) pentamer and less than about 10% (preferably less than about 5%) tetramer and/or hexamer.

The lipophilic fluid can include any fraction of dry-cleaning solvents, especially newer types including fluorinated solvents, or perfluorinated amines. Some perfluorinated amines such as perfluorotributylamines, while unsuitable for use as lipophilic fluid, may be present as one of many possible adjuncts present in the lipophilic fluid-containing composition.

Other suitable lipophilic fluids include, but are not limited to, diol solvent systems e.g., higher diols such as $C_6$ or $C_8$ or higher diols, organosilicone solvents including both cyclic and acyclic types, and the like, and mixtures thereof.

Non-limiting examples of low volatility non-fluorinated organic solvents include for example OLEAN® and other polyol esters, or certain relatively nonvolatile biodegradable mid-chain branched petroleum fractions.

Non-limiting examples of glycol ethers include propylene glycol methyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol methyl ether, tripropylene glycol n-propyl ether, tripropylene glycol t-butyl ether, tripropylene glycol n-butyl ether.

Non-limiting examples of other silicone solvents, in addition to the siloxanes, are well known in the literature, see, for example, Kirk Othmer's Encyclopedia of Chemical Technology, and are available from a number of commercial sources, including GE Silicones, Toshiba Silicone, Bayer, and Dow Corning. For example, one suitable silicone solvent is SF-1528 available from GE Silicones.

Non-limiting examples of glycerine derivative solvents include materials having the following structure:

Non-limiting examples of suitable glycerine derivative solvents for use in the methods and/or apparatuses of the present invention include glyercine derivatives having the following structure:

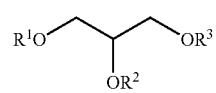

Structure I wherein $R^1$, $R^2$ and $R^3$ are each independently selected from: H; branched or linear, substituted or unsubstituted $C_1$-$C_{30}$ alkyl, $C_2$-$C_{30}$ alkenyl, $C_1$-$C_{30}$ alkoxycarbonyl, $C_3$-$C_{30}$ alkyleneoxyalkyl, $C_1$-$C_{30}$ acyloxy, $C_7$-$C_{30}$ alkylenearyl; $C_4$-$C_{30}$ cycloalkyl; $C_6$-$C_{30}$ aryl; and mixtures thereof. Two or more of $R^1$, $R^2$ and $R^3$ together can form a $C_3$-$C_8$ aromatic or non-aromatic, heterocyclic or non-heterocyclic ring.

Non-limiting examples of suitable glycerine derivative solvents include 2,3-bis(1,1-dimethylethoxy)-1-propanol; 2,3-dimethoxy-1-propanol; 3-methoxy-2-cyclopentoxy-1-propanol; 3-methoxy-1-cyclopentoxy-2-propanol; carbonic acid (2-hydroxy-1-methoxymethyl)ethyl ester methyl ester; glycerol carbonate and mixtures thereof.

Non-limiting examples of other environmentally-friendly solvents include lipophilic fluids that have an ozone formation potential of from about 0 to about 0.31, lipophilic fluids that have a vapor pressure of from about 0 to about 0.1 mm Hg, and/or lipophilic fluids that have a vapor pressure of greater than 0.1 mm Hg, but have an ozone formation potential of from about 0 to about 0.31. Non-limiting examples of such lipophilic fluids that have not previously been described above include carbonate solvents (i.e., methyl carbonates, ethyl carbonates, ethylene carbonates, propylene carbonates, glycerine carbonates) and/or succinate solvents (i.e., dimethyl succinates).

"Ozone Reactivity" as used herein is a measure of a VOC's ability to form ozone in the atmosphere. It is measured as grams of ozone formed per gram of volatile organics. A methodology to determine ozone reactivity is discussed further in W. P. L. Carter, "Development of Ozone Reactivity Scales of Volatile Organic Compounds", Journal of the Air & Waste Management Association, Vol. 44, Page 881-899, 1994. "Vapor Pressure" as used can be measured by techniques defined in Method 310 of the California Air Resources Board.

Preferably, the lipophilic fluid comprises more than 50% by weight of the lipophilic fluid of cyclopentasiloxanes, ("D5") and/or linear analogs having approximately similar volatility, and optionally complemented by other silicone solvents.

The level of lipophilic fluid, when present in the treating compositions according to the present invention, is preferably from about 70% to about 99.99%, more preferably from about 90% to about 99.9%, and even more preferably from about 95% to about 99.8% by weight of the treating composition.

Fabric Care Composition

The fabric care composition of the present invention comprises a lipophilic fluid, a detersive surfactant, and optionally, water and/or cleaning adjuncts.

The detersive surfactant component, when present in the fabric care compositions of the present invention, preferably comprises from about 1% to about 99%, more preferably 2% to about 75%, even more preferably from about 5% to about 60% by weight of the composition.

The composition may optionally comprise a polar solvent, e.g., water, ranging from about 99% to about 1%, preferably from about 5% to about 40%, by weight of the composition; and cleaning adjuncts ranging from about 0.01% to about 50%, preferably from about 5% to about 30%, by weight of the composition When the composition is diluted with a lipophilic fluid to prepare the wash liquor, the fabric care composition comprises from about 0.1% to about 50%, more preferably from about 1% to about 30%, even more preferably from about 2% to about 10% by weight of the wash liquor. Moreover, the amount of the above detersive surfactant in the wash liquor is in the range from about 0.001% to about 50%, preferably from about 1% to about 40%, and more preferably from about 2% to about 30% by weight of the wash liquor.

In some embodiments, water may optionally be incorporated into the wash liquor as well. Water may be added as a component of the fabric care composition or as a co-solvent of the lipophilic fluid in the wash liquor.

Contaminants

The contaminants that may enter the dry cleaning solvent during fabric article treating processes typically include laundry soils, especially lipophilic laundry soils, such as nonionic surfactants, saturated and unsaturated fatty acids, mono-, di- and tri-glycerides, non-polar hydrocarbons, waxes and wax esters, lipids, and mixtures thereof.

The contaminants may also come from the fabric treating composition, including: nonionic surfactants, water, dyes, auxiliary cleaning agents or other cleaning adjuncts. Non-limiting examples of various cleaning adjuncts include: cationic, anionic or zwitterionic surfactants, detergent components which did not adhere to the fabric, enzymes, bleaches, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, sudsing agents, composition malodor control agents, composition coloring agents, pH buffers, waterproofing agents, soil repellency agents, and mixtures thereof.

Membranes

Nonporous membranes operate on the principle of molecular size selectivity. That is, the polymeric membrane material is selective such that small molecules, such as solvent molecules, would be allowed to permeate through the membrane, while any solute molecules larger than a certain molecular size would be rejected. This is referred to as the molecular cut-off value of a membrane. Several factors control the cut-off value of a membrane. For example, for a membrane made of polymers, the cut-off value is affected by factors such as the degree of crosslinking, the type of polymer, the degree of polymerization, the degree of crystallinity and density or packing of the polymer chains.

In general, nonporous membranes have a cut-off value of 200 to 2000 Daltons, in weight-average molecular weight of the solutes. The cut-off value of a membrane is determined by analyzing the solutes that are rejected by the membrane, using gel permeation chromatography (GPC), wherein the GPC is operated according to test method ASTM D6474-99 using polystyrene calibration standards.

The transport of solvent through nonporous membrane can be described as $$\text{Permeability} = \text{Solubility} \times \text{Diffusivity}$$

Solubility relates to the penetrant's ability to wet the membrane material and under equilibrium conditions, certain amount of the penetrant is retained in the membrane. Generally, a higher solubility between the solvent and the polymeric membrane material, would result in a higher the permeability of solvent through the membrane, thus, a higher flux of solvent passing through the membrane.

The Hildebrand solubility parameter ($\delta$) can be used to estimate the compatibility or solubility between the lipophilic fluid and the membrane polymer. Generally, compatibility between two materials can be expected when their solubility parameters are close in value. The polymeric membrane materials suitable for use in the present invention would have a solubility parameter that differs from the solubility parameter of the lipophilic fluid by less than about 5 $\text{MPa}^{1/2}$, preferably less than about 3 $\text{MPa}^{1/2}$. It is known that D5 (decamethyl-cyclopentasiloxane) has a solubility parameter of about 19.7 $\text{MPa}^{1/2}$, and water has a solubility parameter of about 23.4 $\text{MPa}^{1/2}$; there is a large enough difference between these two liquids such that it is feasible to find a membrane that would reject water but allow D5 to permeate through the membrane. For example, a silicone based membrane may allow D5 to permeate through due to their similarities in solubility parameters.

Diffusivity is inversely dependent on the molecular size of the penetrant. As the molecular size increases, the diffusivity decreases. In other words, the cut-off value of a nonporous membrane is a function of membrane diffusivity.

The efficiency of the membrane is measured in Flux (F), which is the amount of material passing through the membrane per unit surface area and time:

$$F = V \times S^{-1} \times t^{-1}$$

wherein V is the volume, S is the membrane surface area, and t is time. The units of flux may be expressed in terms of cubic meters of solution per square meter surface area of membrane per day, or in terms of liters of solution per square meter surface area of membrane per hour.

Flux is directly proportional to permeability, pressure differential, and inversely proportional to membrane thickness. It is found that the non-porous polymeric membrane is particularly effective when used in a pressure driven process. In a pressure driven process, the feed or charge side of the membrane is at pressure sufficient to drive permeate across the membrane and the discharge or permeate side of the membrane is at about atmospheric pressure. As the feed (e.g., a solution of one or more contaminants and a solvent) contacts the membrane, a portion of the feed solvent dissolves into the membrane and diffuses through; the contaminant below the cut-off value of the membrane also passes through to the discharge side; and the contaminant above the cut-off value of the membrane will be rejected by the membrane and be retained on the charge side. The filtered solution on the discharge side is referred to as the "permeate", which tends to be less concentrated in contaminants. In contrast, the incoming feed on the charge side is combined with the rejected contaminants to form the "retentate", which becomes more and more concentrated in contaminants as the membrane filtration process goes on.

Another parameter to measure the efficiency of the membrane is the rejection rate or percent rejection (% R), which is defined by following:

$$\% R = [1 - (C \text{ perm}/C \text{ ret})] * 100$$

wherein Cperm is the concentration of the contaminant in the retentate and Cret is the concentration of the same contaminant in the permeate. Alternatively, the overall concentrations of all the contaminants in the retentate and in the permeate are used in calculating % rejection.

It's desirable that membrane thickness, or in the case of a composite membrane, the thickness of the non-porous polymeric layer, is minimized to obtain higher flux. A membrane thickness of less than 1 µm, or less than about 0.5 µm is suitable for use in the present invention. Due to the solubility of membrane polymer in solvent, polymer typically tends to swell. Cross-linking of the polymeric membrane material would minimize the swelling and help maintaining the integrity of the membrane.

Polymeric Membranes

Nonporous membranes suitable for use herein may comprise polymeric materials such as polytetrafluoroethylene; poly(vinylidene fluoride); polypropylene; polyethylene; cellulose esters; polycarbonate; polysulfone/poly(ether sulfone); polyimide/poly(ether imide); aliphatic polyamide; polyetheretherketone; cross linked polyalkylsiloxane; and mixtures thereof. Suitable membranes are commercially available from GEA Filtration. Membrane examples: nonporous (nanofiltration)—Desal DK from Osmonics Inc. Minnetoka, Minn., porous (microfiltration)—Desal JX from Osmonics Inc. Minnetoka, Minn.

An advantage of using nonporous membranes as compared to the use of porous membranes is that there is no plugging effect, i.e. there is no possibility of the membrane becoming blocked by large molecules retained in the pores.

Inorganic Porous Membranes

Inorganic membranes generally possess superior chemical and thermal stability relative to polymeric materials. Inorganic membrane also possess mechanical integrity such that support layer is not needed. In fact, inorganic membrane can be used as the support layer in a membrane assembly for the polymeric membrane. Four different types of inorganic membranes may be distinguished: ceramic membranes; glass membranes; and metallic membranes (including carbon) and zeolitic membranes. Metallic membranes are obtained by via the sintering of metal powders such as stainless steel, tungsten, or molybdenum. Ceramics are formed by the combination of a metal such as aluminum, titanium, silicum or zirconium with a non-metal in the form of an oxide, nitride, or carbide. Ceramic membranes prepared from such materials from the main class of inorganic membranes, with aluminum oxide or alumina and zirconium oxide or zirconia. These membranes are usually prepared by sintering or by sol-gel processes. Glass membranes (silicon oxide or silica) are prepared by leaching on demixed glasses.

The separation principle of inorganic membranes is similar to polymeric membrane. With the inorganic membranes, the solvent permeates thru well defined pores in an inorganic membrane. The pore size depends on membrane materials and method of membrane formation. The pore structure of inorganic membranes generally does not change when exposed to various solvents, while polymeric membranes may swell to a different extend depending on polymer solubility in a particular solvent. Suitable ceramic membrane can have pore size ranging from 10 to 100 Angstroms, or from 10 to about 50 Angstroms.

The Membrane Assembly

In one embodiment of the present invention, the separation method is performed with a multi-layer membrane assembly which comprises a non-porous polymeric membrane layer and a porous carrier layer which provides mechanical strength and support to the assembly.

In another embodiment of the present invention, the separation process is performed with a multi-layer membrane assembly which comprises (a) a carrier layer which provides mechanical strength, (b) a porous support layer, and (c) a non-porous elastomer or partially crosslinked polymeric membrane layer which provides the separation or filtration effect.

Descriptions of these and other membrane assemblies can be found in U.S. Pat. No. 5,205,934; U.S. Pat. No. 5,265,734; and U.S. Pat. No. 5,151,182.

These membrane assemblies can also be stacked together, in a head-to-head or head-to-tail manner, to enhance the separation performance.

(a) The Carrier Layer

This carrier layer, when used, is characterized by its high degree of porosity and mechanical strength. It may be a fibrous or non-fibrous web and/or a woven or non-woven web. Representative carrier layer may be a porous, flexible, woven fibrous web made of polyester. A typical polyester carrier layer may be formulated of non-woven, thermally-bonded strands.

(b) The Porous Support Layer

Representative porous support layer can be formed of polyacrylonitrile polymer. Typically, the polyacrylonitrile support layer may have a thickness ranging from about 20 to about 100 microns, or from about 40 to about 80 microns, or an average thickness of about 50 microns. In one embodiment, the porous support layer is characterized by a pore size of less than about 10 microns, or more often, less than about 1 micron. In another embodiment, the porous support layer is characterized by a pore size of less than about 500 Angstroms, or more often, less than about 200 Angstroms.

(c) The Non-Porous Separating Layer

Representative separating layer comprises a non-porous elastomer film or membrane having a thickness of about 0.1-5 microns made of polymers selected from the group consisting of polyethylene, polypropylene, cellulose acetate, polystyrene, polytetrafluoroethylene, polyimides, polysulfone, polyethersulfone, polyacrylonitrile, polyvinylidine fluoride, regenerated cellulose, polycarbonate, and mixtures thereof.

In one embodiment, the separating layer comprises a non-porous membrane comprising partially cross-linked polysiloxane, with cross-linking agent which is (i) a polyisocyanate, or (ii) a poly(carbonyl chloride), or (iii) $R_{4-a}Si(A)_a$, wherein A is —OH, —HH$_2$, —OR, or —OOCR; R is hydrogen, a hydrocarbon (such as alkyl, aryl, cycloalkyl, alkaryl, aralkyl), or a fluorocarbon; and a is an integer having the value of 2, 3, or 4.

Polysiloxane Polymers

Representative polysiloxanes which may be employed as the non-porous, elastomeric membranes include halogen-free polysiloxanes having the formula:

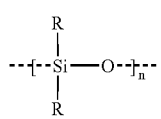

(I)

wherein R may be hydrogen, a hydrocarbon selected from the group consisting of alkyl, aralkyl, cycloalkyl, aryl, and alkaryl, or their fluorinated derivatives (i.e., fluorocarbon moieties). When R is a lower alkyl group, such as linear or branched $C_1$-$C_{10}$ alkyls, including but not limited to methyl, ethyl, n-propyl, iso-propyl, n-butyl, i-butyl, sec-butyl, amyl, hexyls, octyl, decyl, or octadecyl. When R is an aralkyl group, it may be benzyl or beta-phenylethyl. When R is a cycloalkyl group, it may be cyclohexyl, cycloheptyl, cyclooctyl, 2-methylcycloheptyl, 3-butylcyclohexyl, or 3-methylcyclohexyl. When R is an aryl group, it may be phenyl, naphthyl, and derivatives thereof. When R is an alkaryl group, it may be tolyl, xylyl, and derivatives thereof. R may also comprise substituents on the backbone to form a branched structure, wherein the substituents are selected from the group consisting of alkyl, aryl, cycloalkyl, ether, and combinations thereof. Representative substituted R groups may include 2-ethoxyethyl, carboethoxymethyl, 4-methyl cyclohexyl, p-methylphenyl, p-ethylbenzyl, or 3-ethyl-5-methylphenyl.

In one embodiment, one or both R of formula (I) are methyl groups. In another embodiment, the membrane material is di-silanol-terminated poly(dimethyl siloxane) having the formula:

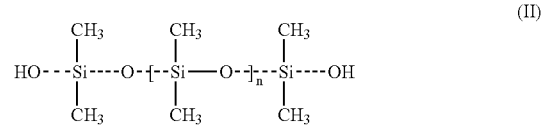

(II)

wherein n is about 7-2000.

In another embodiment, the membrane material is poly(dimethyl siloxane) having other termination groups including but are not limited to acetoxy, methoxy, ethoxy, carbinol, and aminopropyl dimethyl.

Cross-Linkers

Silicone membrane materials suitable for use in the present invention are cross-linked. In the case of the non-cyclic silicones bearing reactive terminal groups such as —OH or —NH$_2$, which may be crosslinked by (i) a polyisocyanate, (ii) a poly(carbonyl chloride) or (iii) a silane having the formula:

$R_{4-a}Si(A)_a$ (II)

wherein A is —OH, —NH$_2$, —OR, or —OCOR, a is 2, 3, or 4, and R are independently selected form the group consisting of hydrogen or a hydrocarbon group selected from the group consisting of alkyl, aralkyl, cycloalkyl, aryl, alkaryl, and mixtures thereof. Representative R groups for formula (II) are same as those R groups described for formula (I) above. The crosslinking is typically effectuated by reactions between the terminal groups of the non-cyclic siloxane and the A groups of the crosslinking agent.

In the case of the cyclic silicones (e.g., decamethyl cyclopentasiloxane), cross-linking is effected by reaction with the cross-linking agents to break the Si—O bond in the ring.

Non-limiting examples of alkoxy silanes suitable for use in the membrane material include methyl triethoxy silane, dimethyl diethoxy silane, dimethyl dimethoxy silane, ethyl trimethoxy silane, phenyl triethoxy silane, benzyl trimethoxy silane, p-tolyl trimethoxy silane, 1,2-dimethoxy tetramethyl disilane, and tetramethoxy silane.

Non-limiting examples of acyloxy silanes suitable for use in the membrane material include dimethyl diacetoxy silane, methyl triacetoxy silane, diethyl diacetoxy silane, dipheny diacetoxy silane benzyl tri acetoxy silane, p-tolyl tri acetoxy silane, tetra acetoxy silane, 1,2-di-acetoxy tetramethyl disilane, 1,2-dimethyl tetra acetoxy disilane.

Non-limiting examples of mixed alkoxy, acyloxy silanes suitable for use in the membrane material include dimethoxy diacetoxy silane, and methoxy triacetoxy silane.

Non-limiting examples of aminosilanes suitable for use in the membrane material include dimethyl diaminosilane or dibutyl diaminosilane; illustrative hydroxy silanes may include diethyl dihydroxy silane or methyl trihydroxy silane.

Non-limiting examples of polyisocyanates suitable for use in the membrane material include toluene diisocyanate, phenylene diisocyanate, hexamethylene diisocyanate, and toluene tri-isocyanate.

Non-limiting examples of poly(carbonyl chlorides) suitable for use in the membrane material include adipoyl dichloride, isophthaloyl dichloride, and suberoyl dichloride.

Formation of the cross-linked elastomer silicone membrane may be carried out in an inert solvent (typified by a hydrocarbon such as hexane) comprising from about 5 to about 15%, or about 10% by weight of the solution of the non-halogenated polysiloxane, and from about 1 to about 10%, or about 4% by weight of the solution of the cross-linking agent.

This solution may be cast onto a support layer (on a carrier layer) to a thickness of about 0.5-4 mils, or about 2 mil. Film casting form the solution is carried out at about room temperature of about 25° C. Subsequently, it is cured at about 110° C.-140° C., or about 125° C. for about 10-20 minutes, or about 15 minutes to form a film having a thickness of about 1-5 microns, or 1.5 microns.

Spiral Wound Membrane

A spiral wound module includes a non-porous separating layer membrane mounted on a porous support layer and a carrier layer, the assembly being typically folded and bonded or sealed along all the edges but an open edge, to form a bag-like unit which preferably has the separating layer on the outside. A cloth spacer, serving as the permeate or discharge channel is placed within the bag-like unit. The discharge channel projects from the open end of the unit.

There is then placed on one face of the bag-like unit, adjacent to the separating layer, and coterminous therewith, a feed channel sheet, typically formed of a plastic net.

The so-formed assembly is wrapped around a preferably cylindrical conduit which bears a plurality of perforations in the wall, preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times such that the assembly is in a readily handleable form. The unit is fitted within a shell (in manner comparable to a shell-and-tube heat exchanger) provided with an inlet at one end and an outlet at the other. A baffle-like seal between the inner surface of the shell and the outer surface of the spiral-wound unit prevents fluid from bypassing the operative membrane system and insures that fluid enters the system principally at one end. The permeate passes from the feed channel, into contact with the separating layer and thence therethrough, into the permeate channel and thence therethrough to and through the perforations in the conduit through which it is withdrawn as net permeate.

In use of the spiral wound membrane, charge liquid is permitted to pass through the plastic net which serves as a feed channel and thence into contact with the nonporous separating membranes. The liquid which does not pass through the membranes is withdrawn as retentate. The liquid which permeates the membrane passes into the volume occupied by the permeate spacer and through this permeate channel to the perforations in the cylindrical conduit through which it is withdrawn from the system. A typical spiral wound module is described in Kirk-Othmer, Encyclopedia of Chemical Technology, 4th Edition, Volume 16, Membrane Technology, pages 158-160.

Tubular Membrane

The polyacrylonitrile porous support layer may be extruded as a fine tube with a wall thickness of typically 0.1-10 mm. The extruded tubes are passed through a bath of silicone which is cross-linked and cured in situ. A bundle of these tubes are secured (with an epoxy adhesive) at each end in a header; and the fibers are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

Membrane Separation Method

During the fabric article treating process, the dry cleaning solvent and/or composition typically become contaminated with contaminants, such as those disclosed above. The present invention is directed to a method for removing contaminants from a used, contaminated dry cleaning solvent by membrane filtration. The contaminants may be chemically modified or otherwise treated such that the modified contaminants become larger in size or less soluble in (e.g., becoming more hydrophilic) with the dry cleaning solvent such that the contaminants can be separated from the solvent more easily. The dry cleaning solvent thus purified can be used as working solvent in subsequent fabric article cleaning cycles. It is recognized that auxiliary methods using chemical modification or a purification agent can also be applied to purify or recycle dry cleaning composition, which may comprise an emulsion of a dry cleaning solvent and water, and various contaminants.

The membrane filtration method of the present invention may be applied to the solvent or composition via an in-line (i.e., in the cleaning cycle) component of the cleaning system or as an accessory (post cleaning cycle) component of the cleaning system.

Efficiency is an important consideration, both from the perspective of in-line filtration and from the perspective of overall operating time per cleaning and/or purification cycle. Thus, a membrane filtration device suitable for use herein would provide a solvent flux of at least 0.1 kg/m$^2$-hr under 500 psi (344.5 Pa) pressure.

A membrane filtration device suitable for use herein would have a rejection rate would have a rejection of at least about 10%, or at lest about 20% or at least about 50% of the overall contaminant concentration in the mixture; and the rejection rate can be as high as greater than about 50%, or greater than about 70%, or greater than about 90% for certain individual contaminants.

From a durability standpoint, a membrane filtration device should desirably have a lifetime of at least 25 cycles before operator intervention and/or changing of membrane or other components become necessary.

A membrane filtration device suitable for use herein will remove sufficient contaminants from the dry cleaning solvent or composition such that the level of contaminants in the purified solvent or composition does not impair its performance when it is used as the working solvent or reformulated (by replacing the cleaning adjuncts that may have been removed in the process) as the working composition in subsequent fabric article treating processes.

The removal of contaminants in the purification process can be 100% removal of contaminants, but it does not have to be. Removal of about 50% to about 100% removal of contaminants present in the contaminated solvent or composition can be sufficient. The type of fabric articles and the type of contaminant are factors that influence the level of contaminants that may remain in the purified solvent or composition without impairing its cleaning performance.

That is, the purified solvent or composition may comprise a higher level of one type of contaminant than another. For example, the level of dyes may be present from about 0.0001% to about 0.1%, preferably from about 0.00001% to about 0.1%, and more preferably from about 0% to about 0.01% by weight of the working solvent. On the other hand, the level of water in the purified solvent may be from about 0.001% to about 20%, preferably from about 0.0001% to about 5% and more preferably from about 0% to about 1%.

In one aspect of the invention, the purified dry cleaning solvent or composition can be collected and or reformulated and can be re-used immediately in several additional fabric cleaning cycles before they need to be purified with the chemical modification method of the present invention. In another aspect of the invention, the purified dry cleaning solvent or composition can be removed from the cleaning system, stored and be used later as the working solvent or composition in another system or another fabric cleaning cycle.

Several separation methods use membranes to effectuate the separation, including dialysis and diafiltration.

Dialysis is the transfer of solute through a membrane as a result of a concentration gradient of the solute across the membrane. Osmosis operates under the same general principles as dialysis, except that the concentration gradient drives the solvent across the membrane. Dialysis is effective in the removal of low molecular weight solute molecules or ions from a solution via their passage through a semipermeable membrane driven by a concentration gradient.

Diafiltration is a variation of conventional dialysis in that the rate of micro-species removal is not dependent on concentration but is a function of the membrane flux, pressure, and membrane surface area relative to the volume to be exchanged or dialyzed. Repeated or continuous addition of fresh solvent flushes out or exchanges salts and other micro species efficiently and rapidly.

The method comprises a first step of providing a mixture of a dry cleaning solvent and at least one contaminant. The mixture may be generated by exposing a fabric article to a dry cleaning solvent or a cleaning composition comprising dry cleaning solvent and other cleaning adjuncts, such as water or surfactants. Alternatively, water may be applied from a separate source to the fabric article in this cleaning step. Then, the used and/or contaminated dry cleaning solvent or cleaning composition, typically in the form of the dry cleaning solvent and water emulsion, are collected and used as the mixture needing purification in the present method.

The cleaning methods to provide the contaminated solvent or composition include conventional immersive cleaning methods as well as the non-immersive cleaning methods disclosed in U.S. patent applications US20020133886A1 and US20020133885A1.

Auxiliary Treating and Separation Methods

The purification method of the present invention may further comprise auxiliary treating methods, in addition to the membrane filtration step, to improve the separation between the lipophilic fluids and certain types of contaminants. The membrane filtration step and one or more auxiliary methods may be combined in any sequence, and may be repeated for any number of times.

(a) Chemical Modification of the Contaminants

One class of the auxiliary treating methods relates to chemical modifications of the contaminants such that the contaminants are converted to modified contaminants, which differ from the unmodified contaminants in at least one of the follow characteristics: molecular weight, polarities, or solubility in the lipophilic solvent. For example, chemical reaction may increase the size of the contaminants such that the modified contaminants are rejected by the membrane and the separation efficiency is improved. In another example, chemical reaction can change the polarity or solubility of the contaminants such that the modified contaminant may have a Hildebrand solubility parameter that results in a higher rejection rate by the membrane.

The chemical reaction takes place via functional moieties on the contaminants. Functional moieties that can be modified include, but are not limited to, acetals, ketals, orthoesters, amides, imides, esters, carbonates, ester-quaternary nitrogen, alkenyls, hydroxyls, aldehydes, protected hydroxyls, carboxylic acids, hydrogen phosphate esters, ethers, amines, Si—O—, Si—O—Si, Si-halogen, and mixtures thereof.

Chemical reactions that can be used to modify the contaminants include, but are not limited to, oxidation, radiation cleavage, derivatization, hydrogenation, reduction, solvolysis, hydrolysis, polymerization, neutralization, digestion by a biological agent, and combinations thereof.

Nonlimiting examples of chemical modification agents useful in these chemical reactions include Examples of chemical modification reactions and chemical modification agents are disclosed in U.S. Provisional Patent Application Ser. No. 60/483,290 (P&G Case 9289P), filed on Jun. 27, 2003, and in U.S. Provisional Patent Application Ser. No. 60/547,355 (P&G Case 9544P), filed on Feb. 24, 2004.

The modified contaminants can be separated from the solvent using membrane filtration and/or other auxiliary separation methods, such as precipitation; sedimentation; centrifugation; decantation; particulate filtration; exposure to an absorbent, an adsorbent, a photocatalyst, or mixtures thereof; magnetic separation; temperature modification; liquid-liquid extraction; and combinations thereof. For example, the modified contaminants that become insoluble in the solvent can be separated from the dry cleaning solvent by density- and/or gravity-based separation methods, such as precipitation, sedimentation, decantation, centrifugation. Exemplary auxiliary separation methods are disclosed in U.S. Provisional Patent Application Ser. No. 60/483,290 (P&G Case 9289P), filed on Jun. 27, 2003, and in U.S. Provisional Patent Application Ser. No. 60/547,355 (P&G Case 9544P), filed on Feb. 24, 2004.

(b) Modification of The Mixture with Purification Agents

Another class of auxiliary treating methods relates to modifying the mixture of contaminants and solvent in such a manner that the contaminants are rendered less soluble in the mixture to facilitate the separation of the contaminants and the solvent by membrane filtration and/or other auxiliary methods.

Modification of the mixture can be effected by contacting the mixture with a purification agent, such as an ionic strength modifier, a pH modifier, a flocculating agent, a gelling agent, a biological agent, a liquid extraction agent, and mixtures thereof. As the mixture gets modified by the purification agents of the present invention, the contaminants become less soluble in the modified mixture and the contaminants may begin to separate out of the bulk solvent, as indicated by cloudiness, precipitate forming, and the like. For example, adding an aggregation agent to the mixture may induce the contaminants to form aggregates, which have higher molecular weight and larger in size, and are more easily rejected by the membrane. Thus, significant improvement in membrane separation efficiency can be achieved.

The ionic strength modifier include, but are not limited to a cation of alkaline, alkaline earth or transitional metals selected from the group consisting of Na; K; Li; Cs; Zn; Mg; Mn; Ni; Ba; Fe; La; Ce; Zr; Ca; Ce; Al; Cu; Fe; magnetizable forms thereof, salt forms thereof, and mixtures thereof. The ionic strength modifier can also include cations, such as $NH_4^+$, alkyl substituted $NH_4^+$, quaternary ammonium cations, and salts thereof.

Nonlimiting examples of pH modifiers include mineral acids, such as HCl, HBr, HI, sulfuric acid, sulfonic acid, nitric acid, phosphoric acid, carboxylic acid; organic acids, such as —COOH substitutents on a hydrocarbon backbone, and mixtures thereof.

Nonlimiting examples of gelling agents include sorbitol gelators, metal fatty ester soaps, calcium silicates and treated calcium silicates, organic derivatives of castor oil, cellulose derivatives, lecithin, xanthum gum, alginate, and mixtures thereof.

Nonlimiting examples of aggregation agents include polymers such as diallyl dimethyl, poly(ethylene oxide), poly(methacrylate), poly(acrylic acid), and mixtures thereof.

Suitable extracting fluid is immiscible with the lipophilic fluid. Nonlimiting examples of extracting fluids include water; linear or branched, cyclic, acyclic or aromatic alcohols; linear or branched, cyclic, acyclic or aromatic diols; and mixtures thereof.

Examples of purification methods and purification agents are disclosed in U.S. Provisional Patent Application Ser. No. 60/483,290 (P&G Case 9289P), filed on Jun. 27, 2003, and in U.S. Provisional Patent Application Ser. No. 60/547,355 (P&G Case 9544P), filed on Feb. 24, 2004.

(c) Auxiliary Separation Methods

Descriptions of some auxiliary separation methods are provided below.

Precipitation is initiated by a phase separation, which leads to the formation of a solid. Subsequently, gravity separates the solid from the bulk solvent in a 1 to 48 hour time period. Additionally, the formation of a precipitate causes an optical change in the bulk solvent, such that the bulk solvent becomes hazy or cloudy.

Sedimentation is the separation of suspended solid particles from a liquid stream via gravitational settling. Sedimentation can also be used to separate solid particles based on differences in their settling rates.

"Decantation" and "density gradation" are gravity-type separation methods. A "decanter" is defined as a vessel used to separate a stream continuously into two liquid phases using the force of gravity. Using Stokes' law, one can derive the settling velocity of the droplets in the continuous phase and design a decanter accordingly.

Centrifugation is a technique that separates materials based upon differences in density, the rate of separation being amplified by applying increasing rotational force. The force is called a centrifugal force and the apparatus providing the rotational force is called a centrifuge. Centrifugation can be used in combination with precipitation or sedimentation to enhance and accelerate the separation.

When the purification agents contain cationic agents based on the alkaline earth metal cations or transitional metal cations, or in their magnetizable form, magnetization can be used to remove the modified contaminants (i.e., precipitants) from the solvent.

Additionally, temperature modification, such as lowering the temperature of the mixture, can further enhance the separation of the contaminants from the mixture. For example, the compatibility or solubility of the contaminants in the solvent or mixture can be reduced with lowering temperature. In another example, the contaminants may undergo phase change (such as crystallization) and precipitate out of the solvent or mixture.

Particulate filtration can be used for the removal of solid particulates, aggregates, or precipitants from liquids. For example, liquids with low solids content can be filtered such that they become optically clear liquids. The cartridges are typically cylindrical in configuration, though other shapes are also acceptable. The filterer media inside the cartridge can be either pleated or non-pleated, disposable or cleanable/regenerable. The filter media is usually supported by and/or integrally bonded to plastic or metal hardware.

Extraction is the selective transfer of a compound or compounds from one liquid to another immiscible liquid or from a solid to a liquid. The former process is called a liquid-liquid extraction, wherein a foreign substance, such as an immiscible liquid, is introduced to provide a second phase, to which the compound(s) can preferentially migrate. The driving force is based on the partition coefficient of the solute compound(s) in the respective liquids. In this separation technique, the compounds in the two liquid phases are merely separated by an interface (i.e., a chemical barrier), not by a physical barrier.

Extracting fluids suitable for use herein to create a second phase from the dry cleaning solvents include, but are not limited to, of water; linear or branched, cyclic or acyclic alcohols; linear or branched, cyclic or acyclic diols; and mixtures thereof.

The modified contaminants can also be removed from the dry cleaning solvent or composition by contacting the mixture with an absorbent material, an adsorbent material, a photocatalyst, or mixtures thereof. These materials can be added to the mixture as solid particulates/powders or can be contained in a cartridge or like container.

Suitable adsorbent materials include, but are not limited to, activated carbon, clay, polar agents, apolar agents, charged agents, zeolites, nanoparticles, and mixtures thereof.

The polar agent suitable for use herein as the adsorbent material has the formula:

$$(Y_a\text{—}O_b)X$$

wherein Y is Si, Al, Ti, P; a is an integer from about 1 to about 5; b is an integer from about 1 to about 10; and X is a metal. In one embodiment, the polar agent suitable for use herein as the adsorbent material is selected from the group consisting of: silica, diatomaceous earth, aluminosilicates, polyamide resin, alumina, zeolites and mixtures thereof. In one embodiment, the polar agent is silica, more specifically silica gel. Suitable polar agents include SILFAM® silica gel, available from Nippon Chemical Industries Co., Tokyo, Japan; and Davisil® 646 silica gel, available from W. R. Grace, Columbia, Md.

Apolar agents suitable for use herein as the adsorbent material comprise one or more of the following: polystyrene, polyethylene, and/or divinyl benzene. The apolar agent may be in the form of a fibrous structure, such as a woven or nonwoven web. Suitable apolar agents include Amberlite® XAD-16 and XAD-4, available from Rohm & Haas, Philadelphia, Pa.

The charged agents suitable for use herein are selected from the group consisting of: anionic materials, cationic materials, zwitterionic materials and mixtures thereof. In one embodiment, the charged agent has the formula:

(W—Z) T wherein W is Si, Al, Ti, P, or a polymer backbone; Z is a charged substituent group and T is a counterion selected from alkaline, alkaline earth metals and mixtures thereof. For example, T may be: sodium, potassium, ammonium, alkylammonium derivatives, hydrogen ion; chloride, hydroxide, fluoride, iodide, carboxylate, etc. The W portion typically comprises from about 1% to about 15% by weight of the charged agent. The polymer backbone typically comprises a material selected from the group consisting of: polystryrene, polyethylene, polydivinyl benzene, polyacrylic acid, polyacrylamide, polysaccharide, polyvinyl alcohol, copolymers of these and mixtures thereof. The charged substituent typically comprises sulfonates, phosphates, quaternary ammonium salts and mixtures thereof. The charged substituent may comprise alcohols; diols; salts of carboxylates; salts of primary and secondary amines and mixtures thereof. Suitable charged agents are available from Rohm & Haas, Philadelphi, Pa., under the designation IRC-50.

Suitable absorbent materials include, but are not limited to, hydrogel-forming absorbent materials or absorbent gelling material (AGM), and mixtures thereof.

Hydrogel-forming absorbent polymers are also commonly referred to as "hydrocolloids" and can include polysaccharides, such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methacrylates, and the respective quaternary salts thereof. The copolymers thereof may be partially neutralized, slightly network crosslinked, or both. Typically, hydrogel-forming absorbent polymers have a multiplicity of anionic or cationic functional groups. These polymers can be used either alone or in mixtures of two or more different polymers. Examples of these polymer materials are disclosed in U.S. Pat. Nos. 3,661,875; 4,076,663; 4,093,776; 4,666,983, and 4,734,478.

Other hydrogel forming materials are also suitable for use herein as the absorbent materials. Nonlimiting examples of these gels suitable for use herein may be based on acrylamides, acrylates, acrylonitriles, diallylammonium chloride, dialkylammonium chloride, and other monomers. Some suitable gels are disclosed in U.S. Pat. Nos. 4,555,344, 4,828,710, and European Application EP 648,521 A2.

The hydrogel-forming polymer component may also be in the form of a mixed-bed ion-exchange composition comprising a cation-exchange hydrogel-forming absorbent polymer and an anion-exchange hydrogel-forming absorbent polymer. Such mixed-bed ion-exchange compositions are described in, e.g., U.S. patent application Ser. No. 09/130,321, filed Jan. 7, 1998 by Ashraf, et al. (P&G Case 6976R); and U.S. Pat. No. 6,121,509.

Suitable photocatalysts include, but are not limited to semiconductor photocatalysts, comprising a transition metal atom exchanged into the framework of a zeolite and/or a mesoporous molecular sieve material, which are subsequently loaded with a photoactive material, such as titanium dioxide. Such semiconductor photocatalysts are described in U.S. Pat. No. 6,585,863.

The Product

The present invention also encompasses a product comprising the membranes described above, a treatment composition, a container for the membrane and the composition, and optionally, additional packaging associated therewith. The treatment composition can be:

(1) a composition comprising a chemical agent selected form the group consisting of an oxidizing agent, a cationic species, an aggregation agent, and mixtures thereof;

(2) a composition comprising an auxiliary treating agent selected from the group consisting of an absorbent, an adsorbent, and mixtures thereof;

(3) a composition comprising an antimicrobial;

(4) a composition comprising an enzyme;

(5) a composition comprising a perfume; and (6) a composition comprising water.

The product further comprises a set of instructions, on the container or the additional packaging associated therewith, for how to use the kit. As such, the instruction may comprise two subsets of instructions. One subset instructs the user to purified the contaminated dry cleaning solvent with the kit according to the method of the present invention. The other subset instructs the user how to put the kit together with an apparatus or cleaning system, such as the ones disclosed herein. Such instruction may include how to put together or apply the membrane and/or the composition with the designated device, cartridge, dispenser, compartment, and the like within the apparatus or the 1ceaning system.

The Cleaning System and Apparatus

The present invention also includes a cleaning system and apparatus suitable for use in the method described above. The cleaning system comprises a fabric article treating vessel, a dry cleaning solvent reservoir, and optionally, a sensor for monitoring the contaminant level in the dry cleaning solvent. When contaminants concentration exceeds some pre-determined value, the sensor would indicate that the dry cleaning solvent has reached maximum contaminant holding tolerance and needs to be purified. Additionally, solvent purification/recovery device comprising a membrane filtration unit capable of conducting the purification method of the present invention may also be provided as an integral part of the system/apparatus. However, it needs not be. The membrane filtration unit can be a stand-alone device, separate from the dry cleaning system.

The cleaning system and apparatus may also comprise dispenser, cartridges, and the like, for the application of treating compositions in the auxiliary treating step(s).

In one embodiment, a membrane filtration system is used in a fabric treating apparatus capable of cleaning fabric articles with lipophilic fluid (FIG. 1). Process step 10 contains contacting lipophilic fluid with fabric articles and cleaning agents that results. The contaminated lipophilic fluid resulting from cleaning of fabric articles in step 10 is collected in reservoir 20 by means of a pump or by gravity draining. Optionally, the reservoir can contain a fluid level sensor to prevent overfilling or underfilling. Collected lipophilic fluid is then treated in step 30 to remove insoluble contaminants that are at least about 100 um in size, preferably about 1 um in size, and more preferably about 0.1 um. Contaminated lipophilic fluid is then treated by a filtration membrane unit 40, preferably a compact spiral wound membrane unit. As contaminated lipophilic fluid is moved thru the membrane filtration unit 40, lipophilic fluid would permeate thru the membrane, preferably, membrane contains nonporous polymer separating layer, producing purified lipophilic fluid. Optionally, an aggregation agent, preferably, water is added to contaminated lipophilic fluid prior to exposure to the membrane filtration unit in process step 35. Also optionally, the aggregation agent may be dispersed or mixed into contaminated lipophilic fluid in order to provide uniform dispersion. An in-line or stationary mixer can be used. Addition of the aggregation agent would improve membrane separation efficiency, as contaminants would form aggregates or micelles produce larger difference between molecular weight of the lipophilic fluid and contaminants. Optionally, contaminated lipophilic fluid is cooled prior to the membrane filtration unit by at least about 5° C., preferably by about 10° C. in order to decrease solubility and promote aggregates formation. Cooling step can be performed with or without aggregation agent addition step.

Optionally, the permeated purified lipophilic fluid is then passed thru an adsorbent material 50 in order to further purify the lipophilic fluid. The purified lipophilic fluid is then collected in a purified lipophilic fluid reservoir 60 and can be used for the next fabric treating cycle.

The purification of contaminated lipophilic fluid may not necessarily be performed after each fabric treating cycle.

The lipophilic fluid containing contaminants that did not permeate thru the membrane in the membrane unit 40 are recycled back to the reservoir 20. The concentration of contaminants in reservoir 20 would gradually increase and eventually reach a solubility limit where the contaminants would become insoluble and would be separated in the treatment step 30.

Any suitable fabric article treating vessel known to those of ordinary skill in the art can be used. The fabric article treating vessel receives and retains a fabric article to be treated during the operation of the cleaning system. In other words, the fabric article treating vessel retains the fabric article while the fabric article is being contacted by the dry cleaning solvent. Nonlimiting examples of suitable fabric article treating vessels include commercial cleaning machines, domestic, in-home, washing machines, and clothes drying machines.

The methods and systems of the present invention may be used in a service, such as a cleaning service, diaper service, uniform cleaning service, or commercial business, such as a laundromat, dry cleaner, linen service which is part of a hotel, restaurant, convention center, airport, cruise ship, port facility, casino, or may be used in the home.

The methods of the present invention may be performed in an apparatus that is a modified existing apparatus and is retrofitted in such a manner as to conduct the method of the present invention in addition to related methods.

The methods of the present invention may also be performed in an apparatus that is specifically built for conducting the present invention and related methods.

Further, the methods of the present invention may be added to another apparatus as part of a dry cleaning solvent processing system. This would include all the associated plumbing, such as connection to a chemical and water supply, and sewerage for waste wash fluids.

The methods of the present invention may also be performed in an apparatus capable of "dual mode" functions. A "dual mode" apparatus is one capable of both washing and drying fabrics within the same vessel (i.e., drum). These apparatuses are commercially available, particularly in Europe.

Additionally, the method of the present invention may also be performed in an apparatus capable of performing "bi-modal" cleaning functions. A "bi-modal" apparatus is one capable of performing both non-aqueous washing and aqueous washing in the same vessel, wherein the two washing modes can be performed in sequential washing cycles or in a combination washing cycle. Additionally, the bi-modal machine can also be capable of fully drying the clothes without having to transfer them to a separate machine. That is, a machine can have the bi-modal function as well as the dual-mode function.

An apparatus suitable for use in the present invention will typically contain some type of control systems, including electrical systems, such as "smart control systems", as well as more traditional electromechanical systems. The control systems would enable the user to select the size of the fabric load to be cleaned, the type of soiling, the extent of the soiling, the time for the cleaning cycle. Alternatively, the control systems provide for pre-set cleaning and/or refreshing cycles, or for controlling the length of the cycle, based on any number of ascertainable parameters the user programmed into the apparatus. For example, when the collection rate of dry cleaning solvent reaches a steady rate, the apparatus could turn its self off after a fixed period of time, or initiate another cycle for the dry cleaning solvent.

In the case of electrical control systems, one option is to make the control device a so-called "smart device", which provides smart functions, such as self diagnostics; load type and cycle selection; Internet links, which allow the user to start the apparatus remotely, inform the user when the apparatus has cleaned a fabric article, or allow the supplier to remotely diagnose problems if the apparatus malfunctioned. Furthermore, if the system of the present invention is only a part of a cleaning system, the so called "smart system" could be communicating with the other cleaning devices which would be used to complete the remainder of the cleaning, such as a washing machine, and a dryer.

Test Method: Thin Layer Chromatography

The percentage of contaminants removed from the lipophilic fluid can determined by Thin Layer Chromatography (TLC).

A vial containing a mixture of 100 grams of a lipophilic liquid and 0.1 grams of an artificial body soil (available from Empirical Manufacturing Company Inc., Cincinnati, Ohio) and 0.1 grams of Neodol 91-2.5 surfactant (available from Shell Chemical Co., Houston, Tex.) is prepared; both the artificial body soil and the surfactant are considered contaminants for the purpose of this test.

A 2 microliters sample is taken from the mixture containing the lipophilic fluid and added contaminants and the mixture after it is purified by the present method; both are analyzed by TLC on Silica Gel G plates (inorganic binder, #01011, 20 cm×20 cm, available from Analtech, Inc. Newark, Del.).

Three developing solvents were used in the TLC analysis: (1) 100% heptane; (2) toluene:hexane at a volume ratio of 160:40; and (3) hexane:diethyl ether:acetic acid at a volume ratio of 160:40:2; all solvents were purchased from Burdick & Jackson. The first solvent system is allowed to migrate up to the top of the TLC plate to the horizontal line (17.5 cm) and typically takes about 30 minutes. The TLC plate is dried for 20 minutes. The second solvent system is allowed to migrate 16.5 cm up the plate and typically takes about 26 minutes. The TLC plate is dried for 30 minutes. The third solvent system is allowed to migrate 9.5 cm up the plate and typically takes about 9 minutes. The TLC plate is dried for 30 minutes. Spray the dried TLC plate evenly with 5-7 milliliters of 25% sulfuric acid and place on a hot plate heated to 250°-260° C. and covered with a ceramic tape. Allow the plate to remain on the hot plate until fully charred (10-30 minutes). The charring time will vary according to the compounds tested. Remove the plate from the hot plate with heated spatulas (to prevent breakage) and place on a glass cloth pad to cool. The charred plated is scanned using Camag Scanner 3 densitometer (from Camag, Switzerland).

A TLC spectrum was measured as area under the curve displayed by the densitometer. The total contaminants removed from the mixture were calculated using formula:

$$MR = S - \left(\frac{A}{B} * S\right)$$

wherein MR=Mass of contaminants removed;
S=Mass of contaminants added to the mixture;
A=TLC area from the mixture purified by the present method; and
B=TLC area from the mixture before the purification process.

EXAMPLES

Example 1

Contaminated or "dirty" dry cleaning solvent, decamethylcyclopentasiloxane, was obtained from Prestige Cleaners, Sacramento, Calif. The solvent was pressurized using compressed nitrogen and fed to a rectangular test cell (16 cm² membrane area) at a flow rate of 50 g/min containing a polysiloxane membrane, code name M20, made by Membrane Technology and Research Inc., Menlo Park, Calif. The solvent feed and permeate samples were collected after 4 L of solvent was passed thru the test cell. The feed "dirty" solvent and permeate solvent samples were analyzed by TLC, from which % reduction of laundry soils between feed and permeate solvent was calculated for individual soil components that appeared as peaks on resulting TLC spectra. The table below shows the results:

| TLC peak No. | 1 | 2 | 3 | 4 | 5 |
|---|---|---|---|---|---|
| % reduction | 15.0 | 4.8 | 7.5 | 8.6 | 13.0 |

All documents cited are, in relevant part, incorporated herein by reference; the citation of any document is not to be construed as an admission that it is prior art with respect to the present invention.

While particular embodiments of the present invention have been illustrated and described, it would be apparent to those skilled in the art that various other changes and modifications can be made without departing from the spirit and scope of the invention. It is therefore intended to cover in the appended claims all such changes and modifications that are within the scope of this invention.

What is claimed is:

1. A process for purifying a lipophilic fluid containing laundry soils, the process comprising the steps of:
   a. providing a contaminated mixture comprising a lipophilic fluid, said fluid comprising linear siloxanes, cyclic siloxanes and mixtures thereof, and laundry soils;
   b. passing the contaminated mixture through a non-porous cross-linked polysiloxane membrane, thereby removing the laundry soils and converting the contaminated lipophilic fluid to a purified lipophilic fluid.

2. The process according to claim 1 wherein after step (b), the concentration of the laundry soils in the mixture is reduced by at least about 10%.

3. The process according to claim 1 wherein the membrane provides a lipophilic fluid flux of at least about 0.1 kg/m². hr 500 psi (344.5 Pa) pressure.

4. The process according to claim 1 wherein step (b) is repealed through a series of same or different membranes.

5. The process according to claim 1 wherein the process further comprises an auxiliary treating step before and/or after step (b).

6. The process according to claim 5 wherein same or different auxiliary treating steps may be repeated.

7. The process according to claim 5 wherein the auxiliary treating steps are consecutive, separated by one or more step (b), or combinations thereof.

8. The process according to claim 5 wherein the auxiliary treating step employs chemical modifications of the laundry soils, modifications of the mixture with a purifying agent, auxiliary separation methods, and combinations thereof.

9. The process according to claim 8 wherein the auxiliary separation method is selected from the group consisting of precipitation; sedimentation; decantation; centrifugation; particulate filtration; magnetic separation; temperature modification; extraction, exposure to adsorbents, absorbents, photocatalyst, or mixtures thereof; and combinations thereof.

10. The process according to claim 1 wherein the contaminated mixture is cooled by at least about 10° C. before passing through said membrane.

11. The process according to claim 1 wherein a Hilderbrand solubility parameter of the polysiloxane membrane and a Hilderbrand solubility parameter of the lipophilic fluid differ by less than about 5 MPa$^{1/2}$.

12. The process according to claim 1 wherein the membrane comprises a polysiloxane having the formula:

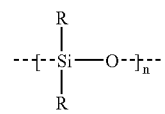

wherein R is hydrogen, alkyl, aralkyl, cycloalkyl, aryl, and alkaryl hydrocarbons or fluorocarbons; n is an integer from 7 to 2000; and the polysiloxane is cross-linked with a cross-linking agent.

13. The process according to claim 1 wherein the membrane is a flat film membrane, a tubular membrane, or a spiral wound membrane.

14. The process according to claim 1 wherein the laundry soils are selected from the group consisting of nonionic surfactants; mono-, di-, and tri-glycerides, saturated and unsaturated fatty acids, non-polar hydrocarbons, waxes and wax esters, lipids; and mixtures thereof.

15. The process according to claim 14 wherein the laundry soils further comprises contaminants selected from the group consisting of water, enzymes, bleaches, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, sudsing agents, composition malodor control agents, composition coloring agents, pH buffers, waterproofing agents, soil repellency agents, and mixtures thereof.

16. A process according to claim 1 wherein said lipophilic fluid comprises decamethylcyclopentasiloxane.

* * * * *

UNITED STATES PATENT AND TRADEMARK OFFICE
CERTIFICATE OF CORRECTION

PATENT NO. : 7,297,277 B2
APPLICATION NO. : 10/876123
DATED : November 20, 2007
INVENTOR(S) : Radomyselski et al.

It is certified that error appears in the above-identified patent and that said Letters Patent is hereby corrected as shown below:

Column 18
Line 29, delete "1ceaning" and insert -- cleaning --.

Column 22
Line 5, delete "repealed" and insert -- repeated --.

Signed and Sealed this

Twenty Second Day of April, 2008

JON W. DUDAS
*Director of the United States Patent and Trademark Office*